US011467309B2

(12) United States Patent
Jagannathan

(10) Patent No.: US 11,467,309 B2
(45) Date of Patent: Oct. 11, 2022

(54) SYNTHETIC APERTURE TO IMAGE LEAKS AND SOUND SOURCES

(71) Applicant: HALLIBURTON ENERGY SERVICES, INC., Houston, TX (US)

(72) Inventor: Srinivasan Jagannathan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 550 days.

(21) Appl. No.: 16/063,219

(22) PCT Filed: Aug. 23, 2017

(86) PCT No.: PCT/US2017/048263
§ 371 (c)(1),
(2) Date: Jun. 15, 2018

(87) PCT Pub. No.: WO2019/040064
PCT Pub. Date: Feb. 28, 2019

(65) Prior Publication Data
US 2020/0271808 A1 Aug. 27, 2020

(51) Int. Cl.
*G01V 1/50* (2006.01)
*E21B 47/107* (2012.01)
*G01V 1/46* (2006.01)

(52) U.S. Cl.
CPC .............. *G01V 1/50* (2013.01); *E21B 47/107* (2020.05); *G01V 1/46* (2013.01); *G01V 2210/667* (2013.01)

(58) Field of Classification Search
CPC ...... G01V 1/50; G01V 1/46; G01V 2210/667; E21B 47/107
See application file for complete search history.

(56) References Cited

U.S. PATENT DOCUMENTS 8,843,342 B2 * 9/2014 Vold ...................... G03H 3/00
 702/109
10,324,212 B2 * 6/2019 Padhi ....................... G01V 1/50
(Continued)

FOREIGN PATENT DOCUMENTS

WO WO-2016/159959 A1 10/2016
WO WO-2017/062015 A1 4/2017

OTHER PUBLICATIONS

A. Royal and et al, "Site Assessment of Multiple-Sensor Approaches for Buried Utility Detection", International Journal of Geophysics vol. 2011, Article ID 496123, 19 pages doi:10.1155/2011/496123 (Year: 2011).*

(Continued)

*Primary Examiner* — Douglas Kay
(74) *Attorney, Agent, or Firm* — John Wustenberg; C. Tumey Law Group PLLC

(57) ABSTRACT

The subject technology relates to synthetic aperture to image leaks and sound sources. Other methods and systems are also disclosed. The subject technology includes drilling a wellbore penetrating a subterranean formation. The subject technology includes logging the wellbore using the stationary acoustic sensor and the moving acoustic sensor of the logging tool to obtain logged measurements, and obtaining an actual acoustic signal associated with a leak source in the wellbore using logged measurement data. The subject technology also includes determining a synthetic acoustic signal indicating an estimated leak source in the wellbore, and determining a correlation between the synthetic acoustic signal and the actual acoustic signal. The subject technology also includes generating a probability map from the determined correlation, in which the probability map indicates a likelihood of the leak source being located at a given location in the wellbore based on the probability map.

18 Claims, 8 Drawing Sheets

(56) References Cited

U.S. PATENT DOCUMENTS

| | | | |
|---|---|---|---|
| 2008/0219096 A1* | 9/2008 | Underhill | G01V 1/42 |
| | | | 367/57 |
| 2010/0008515 A1* | 1/2010 | Fulton | H04R 3/005 |
| | | | 381/92 |
| 2010/0268489 A1 | 10/2010 | Lie et al. | |
| 2011/0293171 A1* | 12/2011 | Vold | G03H 1/0866 |
| | | | 382/154 |
| 2016/0070014 A1 | 3/2016 | Khajeh et al. | |
| 2016/0296680 A1* | 10/2016 | Simmons | A61M 1/06 |
| 2017/0133034 A1* | 5/2017 | Uhle | G10L 19/0204 |
| 2017/0184751 A1* | 6/2017 | Ang | G01V 1/44 |
| 2018/0258756 A1* | 9/2018 | Nguyen | G06T 3/4038 |
| 2019/0049612 A1* | 2/2019 | Padhi | G01V 1/50 |
| 2019/0120045 A1* | 4/2019 | Andersen | E21B 47/107 |
| 2019/0169982 A1* | 6/2019 | Hauge | E21B 47/10 |
| 2019/0368337 A1* | 12/2019 | Maresca, Jr. | G01M 3/2876 |

OTHER PUBLICATIONS

International Search Report and Written Opinion from PCT/US2017/048263, dated May 23, 2018, 14 pages.

\* cited by examiner

SYNTHETIC APERTURE TO IMAGE LEAKS AND SOUND SOURCES

TECHNICAL FIELD

The present disclosure relates to acoustic sensing logging measurement systems, and more particularly to synthetic aperture to image leaks and sound sources.

BACKGROUND

During the life cycle of an oil or gas well, it is desirable to monitor and maintain well integrity. In particular, maintaining the integrity of well barriers, such as production tubing, well casing, and surrounding cement sheaths (if any), is important to ensure safe operation of the well and avoid blow-out incidents or leakage of hydrocarbons to the environment. To obtain a better understanding of the state of a well and make appropriate decisions on repairing or controlling a damaged well, it is desirable to detect the presence, extent, and location (depth) of fluid flowing near or into a wellbore since such information can be utilized in completing wells, performing remedial work, and/or determining one or more characteristics of hydrocarbon reservoirs or the surrounding formation. Monitoring downhole flows around wellbores, such as injected water, can further be of interest in reservoir characterization.

Acoustic sensors carried by downhole tools have traditionally been used to detect fluid flow into wellbores. Fluid entering the wellbore through small areas or flowing behind the wellbore wall creates turbulence and noise, which may be perceived by the acoustic sensors.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

DETAILED DESCRIPTION

Figure 1:
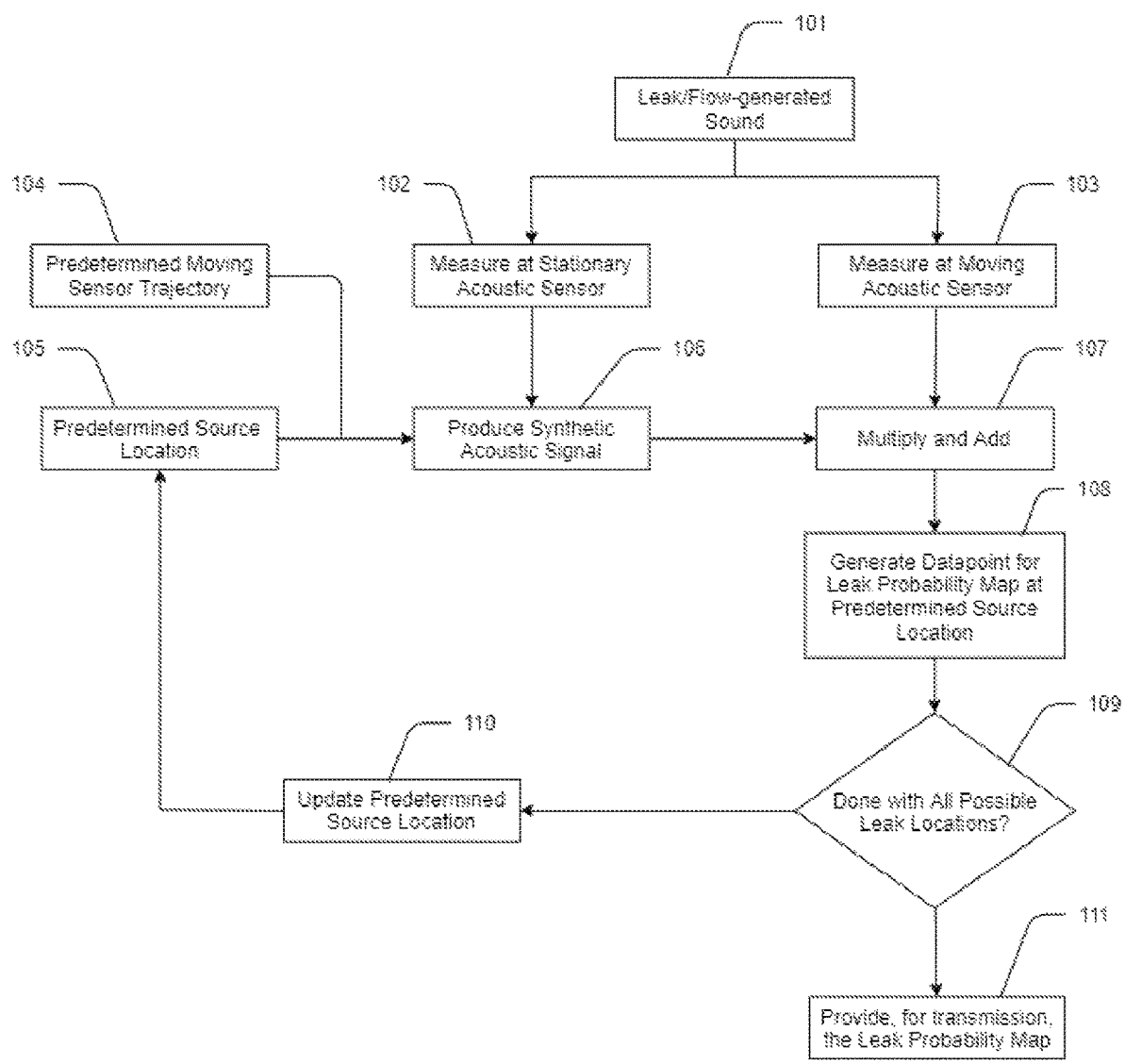
FIG. 1 illustrates an example process of creating a synthetic aperture to image leaks and sound sources according to certain aspects of the disclosure.

The subject technology relates to detecting leaks and flows of a downhole and estimating their locations within the wellbore at the time of logging to ensure proper maintenance of production and overall health of a well. The present application relates to acoustic-based logging measurements and, more specifically, a synthetic aperture to image leaks and sound sources that may occur in any annulus or in a subterranean formation in the presence of multiple casing strings. Uniquely, the methods and algorithms described herein use a stationary acoustic sensor to measure a time variation of a leak source and a moving acoustic sensor to measure both time and spatial behavior of the leak source to provide a multi-dimensional probability map of probable locations for the leak and sound source.

The disclosed system addresses a problem in traditional acoustic sensing logging systems tied to computer technology, namely the technical problem of imaging an accurate detection of leak and sound sources in the subterranean formation. Well integrity is very important and the existence of old and aging wells with leaks is growing. Some traditional downhole tools that can perform leak detection rely on single stationary sensor measurements based on incoherent processing. This approach only measures the depth of the leak and does not form an image of the leak itself. In this respect, identification of a string of pipe (in a case of multiple pipe strings) that is leaking is challenging. In another approach, the traditional downhole tools perform leak detection by deploying an array of acoustic sensors, which limits the detection in terms of aperture because of bandwidth limitations. Other approaches in other fields such as sound-source detection have attempted to solve the problem of imaging using synthetic aperture radar (SAR) and synthetic aperture sonar (SAS). These SAR/SAS techniques, have attempted to detect sound-sources by using an active source and a single moving receiver. In this approach, the sound source is detected by using coherent "pinging" of another source with a known repetition rate. Other approaches have assumed that the sound-source is stationary that radiates a narrow-band signal with a constant phase and magnitude.

Leaks and flows generate sound, and this sound can be captured by means of two sensors, a stationary acoustic sensor and a moving acoustic sensor with a predetermined trajectory. For example, the first acoustic sensor may move vertically up or down the borehole, while the sensor acoustic remains stationary at the center of the borehole. The leak-generated sound may be either broadband (for gas leaks) or band-limited to lower frequencies such as a few kilohertz (for liquid leaks). The leak signal is also expected to be of random magnitude and phase such that its autocorrelation is approximately a delta function in time. Such a random noise behavior makes it challenging to use only a single sensor passive synthetic aperture to image the leak. In some aspects, the stationary acoustic sensor of the subject technology is configured to capture the time variation of the leak sound and the moving acoustic sensor of the subject technology is configured to capture both the time and spatial behavior of the leak signal. The subject technology includes definition of a search (or leak probability map), which describes all possible locations of the leak source. For every possible source position on the search grid, the known trajectory of the moving acoustic sensor is used in conjunction with the signal recorded by the stationary acoustic sensor to synthesize the signal recorded by the moving acoustic sensor.

The subject technology provides several advantages over the traditional acoustic sensing logging systems in order to accurately detect the leak and sound sources. The use of a single moving acoustic sensor in conjunction with a stationary acoustic sensor provides for a longer array of measurements to be taken using fewer hydrophones compared to the traditional acoustic sensing logging systems.

The disclosed system further provides improvements to the operations performed by the computer because it saves data storage space, reduces system loading times and reduces the cost of system resources. Specifically, measurements gathered from a single moving acoustic sensor as opposed to an array of stationary acoustic sensors decreases the amount of data that is processed and stored. The sample information that corresponds to a location of the predicted source position is indexed by a corresponding location of the leak probability map, which helps reduce system loading times. The sample information is also limited to a relevant sampling window that corresponds to a computed offset indicating an acoustic signal propagation delay, which helps to reduce both data storage space and the cost of system resources.

FIG. 1 illustrates an example process 100 of creating a synthetic aperture to image leaks and sound sources according to certain aspects of the disclosure. A flow (or leak) in a wellbore (see FIGS. 5 and 6) generates noise and otherwise provides an acoustic source that exhibits certain temporal and spectral characteristics. In the time domain, for example, the flow-generated noise is assumed to be continuous and statistically stationary over a certain time scale. In the frequency domain, the spectrum of the noise may be broadband (for gas leaks) in some implementations, or the spectrum of the noise may be band-limited (for liquid leaks) in other implementations. The characteristics of the acoustic source may vary depending on various factors including, but not limited to, (1) the type of flow (i.e. turbulent/laminar), (2) the dimensions of the orifice/channel where the flow is occurring, (3) the phase of the fluid, and (4) the flow rate of the flow.

The sound generated by the flow (or leak), as at 101, may be detected (perceived) by a stationary acoustic sensor at a fixed position along the wellbore and a moving acoustic sensor traversing the wellbore in a predetermined trajectory along an axial length of the wellbore. In some aspects, the stationary acoustic sensor may be arranged and otherwise positioned in a fixed position along the longitudinal axis of the wellbore. In an aspect, the stationary acoustic sensor is at a center position of the wellbore. In some aspects, the moving acoustic sensor may be arranged and otherwise position in an initial position along the longitudinal axis of the wellbore, and move vertically up or down relative to the stationary acoustic sensor. Each acoustic sensor (e.g., stationary acoustic sensor, moving acoustic sensor) is designed such that it is sensitive to to a broad range of frequencies from 200 Hz to 100 kHz.

The leak/flow-generated sound is recorded by stationary acoustic sensor (102). The stationary acoustic sensor may record one or more signal characteristics of the leak signal as a function of time in order to capture the time variation of the leak signal. In one or more aspects, the signal characteristics recorded by the stationary acoustic sensor may include magnitude and phase. The fixed position (or two-dimensional coordinate) of the stationary acoustic sensor may be expressed as (rsx, rsy).

The leak/flow-generated sound is recorded by the moving acoustic sensor (103). The moving acoustic sensor may record the one or more signal characteristics of the leak signal as a function of time and/or as a function of distance to capture both the time and spatial behavior of the leak signal. In some aspects, the measurements taken by the moving acoustic sensor occur concurrently with the measurements being taken by the stationary acoustic sensor. In other aspects, the measurements taken by the moving acoustic sensor and the stationary acoustic sensor occur at different times such as sequential to one another.

The output of the stationary acoustic sensor is then processed to produce a synthetic signal that tracks the signal recorded by the moving acoustic sensor (106). To produce the synthetic signal, the predetermined moving acoustic sensor trajectory (104) and a predetermined source location (105) are provided as additional inputs. The predetermined moving acoustic sensor trajectory may represent multiple predetermined spatial locations where measurements may be recorded by a single moving receiver (i.e., the moving acoustic sensor). The predetermined moving sensor trajectory as a function of time may be expressed as (rx(t), ry(t)). The predetermined source location may be expressed as (sx,sy), where the coordinate represents a grid location in the search grid.

In one or more implementations, synthesizing the signal recorded by the moving acoustic sensor (106) includes multiple sub-steps. In a first sub-step, for example, the time taken for the leak signal to arrive at (rsx, rsy) is computed as ts. In a second sub-step, for example, the leak signal received at the stationary acoustic sensor is then shifted by time ts. The time-shifted leak signal represents the time signal of the leak ("sigleak"). In a third sub-step, for the sampling time period recorded by the moving acoustic sensor, the time taken by the leak signal to travel to each of the receiver locations of the moving acoustic sensor along the predetermined moving sensor trajectory (e.g., rx(t), ry(t)) is computed as tm. The "sigleak" is summed with the regular sampling time period of the moving acoustic sensor to compute a net sampling time of TT. In a fourth sub-step, the relevant samples of "sigleak" corresponding to the net sampling time (e.g., TT) are computed. In one or more implementations, the number of relevant sample instances are computed by multiplying the net sampling time (e.g., TT) by a sample frequency of the leak signal denoted as fs. In some aspects, the computed relevant samples of "sigleak" may be aggregated as an array of samples to represent the synthetic signal.

The output of the moving acoustic sensor may be processed using a correlation process where the synthetic signal that extrapolates the time signals of the leak signal and it is correlated with the acoustic source measurements being recorded by the moving receiver (i.e., the moving acoustic sensor) at the predetermined spatial locations. This process exploits the phase relationship of the signals received at the receiver locations (i.e., by the stationary acoustic sensor and the moving acoustic sensor) to determine a specific source location. In some aspects, each of the samples of the synthetic signal and the measurements recorded by the moving acoustic sensor are multiplied together at each predetermined spatial location, and the results across the samples at each predetermined spatial location are summed together to provide a probabilistic value for a given grid location (107). In one or more aspects, the absolute form of the probabilistic value is provided to an array corresponding to the location of the assumed source position (108).

The process 100 proceeds to step 109, where a determination is made on whether all possible leak locations are complete (e.g., each grid location has been accounted for). If not, the process 100 continues to step 110 to select the next grid location and, thereby, update the possible source location. Otherwise, at the end of the process, as at 111, a fluid flow (leak) probability map is generated based on the results of the correlation process. The process 100 is iterated for each grid location (or source position) of the search grid. The leak probability map may include a value within a range of 0.0 and 1.0 indicating either a relatively high probability (e.g., greater than 0.50) of the leak source being at that position, or a relatively low probability (e.g., smaller than 0.50) of the leak source being at that position.

Figure 2A:
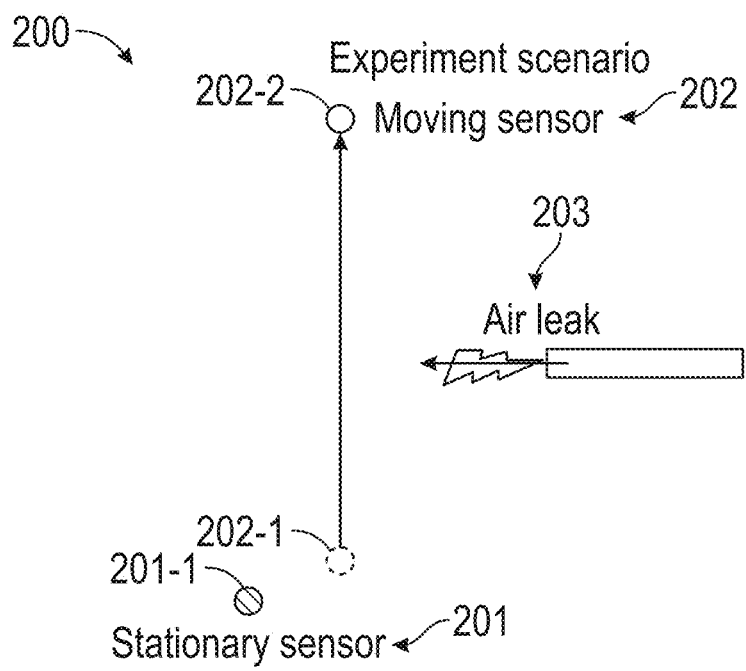
FIG. 2A illustrates a conceptual diagram of an example of a stationary acoustic sensor and a moving acoustic sensor relative to an air leak source.

FIG. 2A illustrates a conceptual diagram 200 of an example of a stationary acoustic sensor (e.g., 201) and a moving acoustic sensor (e.g., 202) relative to an air leak source. As illustrated, the stationary acoustic sensor is positioned at a fixed location (e.g., 201-1) and the moving acoustic sensor is depicted with a starting position (e.g., 202-1) and an ending position (e.g., 202-2). The starting position (e.g., 202-1) of the moving acoustic sensor may be proximate to the fixed location (e.g., 201-1) of the stationary acoustic sensor in some implementations, or may be at a remote distance from the fixed location of the stationary acoustic sensor in other implementations. In operation, the moving acoustic sensor moves along a predetermined trajectory from the starting position to the ending position. The moving acoustic sensor may move relative to the stationary acoustic sensor such as moving away from the stationary acoustic sensor along a longitudinal axis of the wellbore. The distance between the fixed location of the stationary acoustic sensor and the ending position of the moving acoustic sensor may be limited to the distance defined by the predetermined trajectory of the moving acoustic sensor.

A source area (e.g., 203) may be defined adjacent to one or more of the acoustic sensors (e.g., 201, 202) and may generally include one or more sources of leaks/flows (e.g., gas flow) that generate an acoustic signal. The dimensions (e.g., the radial and/or axial extent) of the source area 203 may be such that a wavefront of an acoustic signal generated by an acoustic source placed at any location in the source area 203 has a non-linear shape when received by the acoustic sensors (e.g., 201, 202). In free-space, the wavefront of the acoustic signal propagates unhindered toward the acoustic sensors (e.g., 201, 202) as a non-linear-spreading waveform emanating from the source area 203. As a result, there is a different propagation delay for the noise signal (or leak signal) as it is respectively received by the acoustic sensors (e.g., 201, 202). In FIG. 2A, the source area 203 is illustrated spatially separated from the acoustic sensors (e.g., 201, 202). However, in other examples, the acoustic sensors (e.g., 201, 202) may be positioned in the source area 203 or may at least partially overlap the source area 203.

Figure 2B:
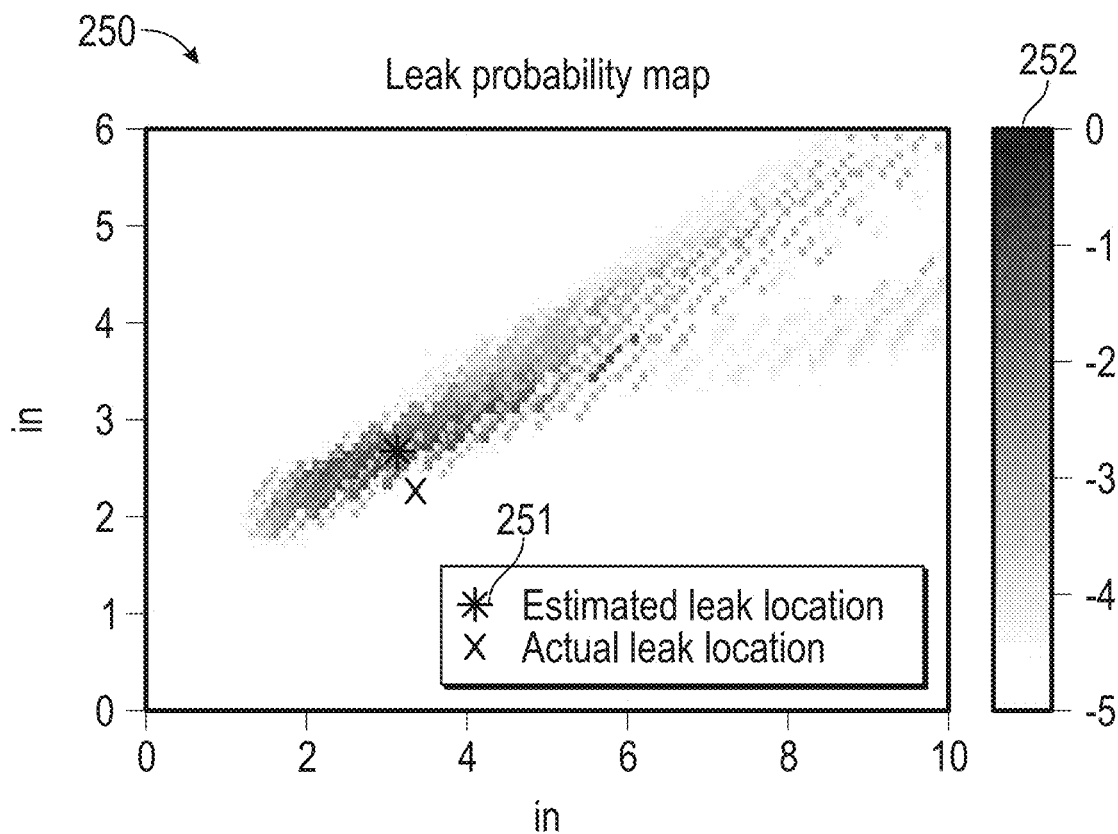
FIG. 2B illustrates a plot of an example of a leak probability map indicating a probability of the air leak source for each map location.

FIG. 2B illustrates a plot of an example of a leak probability map 250 indicating a probability of the air leak source for each map location. The leak probability map 250 is a two-dimensional plot indicating the likelihood of a leak source being at a given (x,y) coordinate of the map. The x-axis represents a wellbore horizontal distance in a range of 0 to 10 inches, and the y-axis represents a wellbore vertical distance in a range of 0 to 6 inches. In some aspects, the leak probability map 250 captures the two-dimensional spatial behavior of the leak signal for a given wellbore depth. In this respect, multiple leak probability maps may be generated from a wellbore at multiple depths. The probability values computed for the leak probability map 250 may be defined by a logarithmic scale 252 that is in a range of 0 to −5 by increments of 1.0 unit, where the peak probability value is denoted (or marked) on the leak probability map 250 as an estimated leak location 251. The probability values may be defined by a linear scale in other implementations. In some aspects, the origin of the leak probability map 250 (e.g., (0,0) coordinate) may be defined as predetermined reference location within the wellbore, such that any distances are measured relative to the predetermined reference location. As illustrated, the estimated leak location 251 is about 2.5 inches vertically from the reference location (e.g., (0,0)) and about 2.5 inches horizontally from the reference relocation.

Figure 3A:
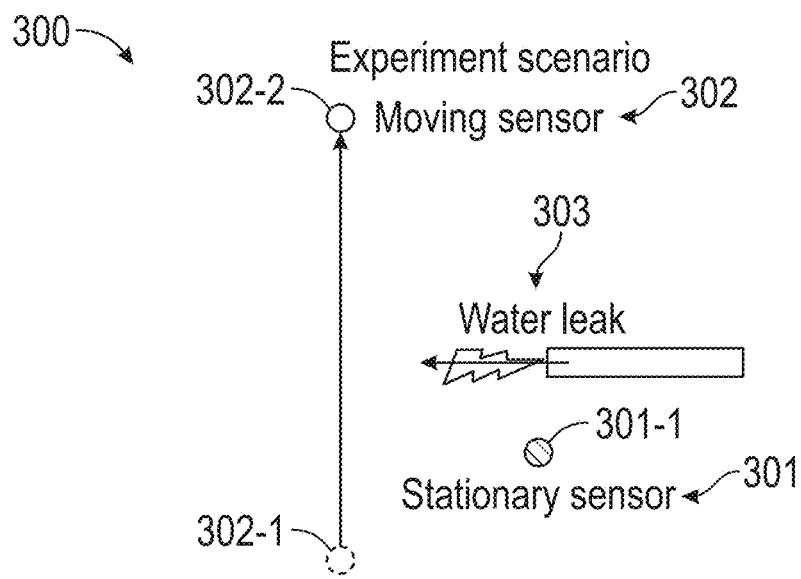
FIG. 3A illustrates a conceptual diagram of an example of a stationary acoustic sensor and a moving acoustic sensor relative to a water leak source.

FIG. 3A illustrates a conceptual diagram 300 of an example of a stationary acoustic sensor (e.g., 301) and a moving acoustic sensor (e.g., 302) relative to a water leak source. As illustrated, the stationary acoustic sensor (e.g., 301) is positioned at a fixed location (e.g., 301-1) and the moving acoustic sensor (e.g., 302) is depicted with a starting position (e.g., 302-1) and an ending position (e.g., 302-2).

A source area (e.g., 303) may be defined adjacent to one or more of the acoustic sensors (e.g., 201, 202) and may generally include one or more sources of leaks/flows water flow) that generate an acoustic signal. As illustrated, the fixed location (e.g., 301-1) is within proximity to the source area 303. The starting position (e.g., 302-1) of the moving acoustic sensor may be a first distance below the fixed location (e.g., 301-1) of the stationary acoustic sensor, and the ending distance (e.g., 302-2) of the moving acoustic sensor may be a second distance above the fixed location (e.g., 301-1) of the stationary acoustic sensor, where the second distance is greater than the first distance in some implementations. In other implementations, the second distance is smaller than the first distance. In still other implementations, the first distance and the second distance are equivalent. In this example, the distance between the fixed location of the stationary acoustic to the source area 303 is smaller than each of the distances between the receiver locations of the moving acoustic sensor and the source area 303 and, therefore, the propagation delay of the leak signal to the stationary acoustic sensor (e.g., ts) is smaller than the propagation delay of the leak signal to the moving acoustic sensor locations (e.g., t(x,y)).

Figure 3B:
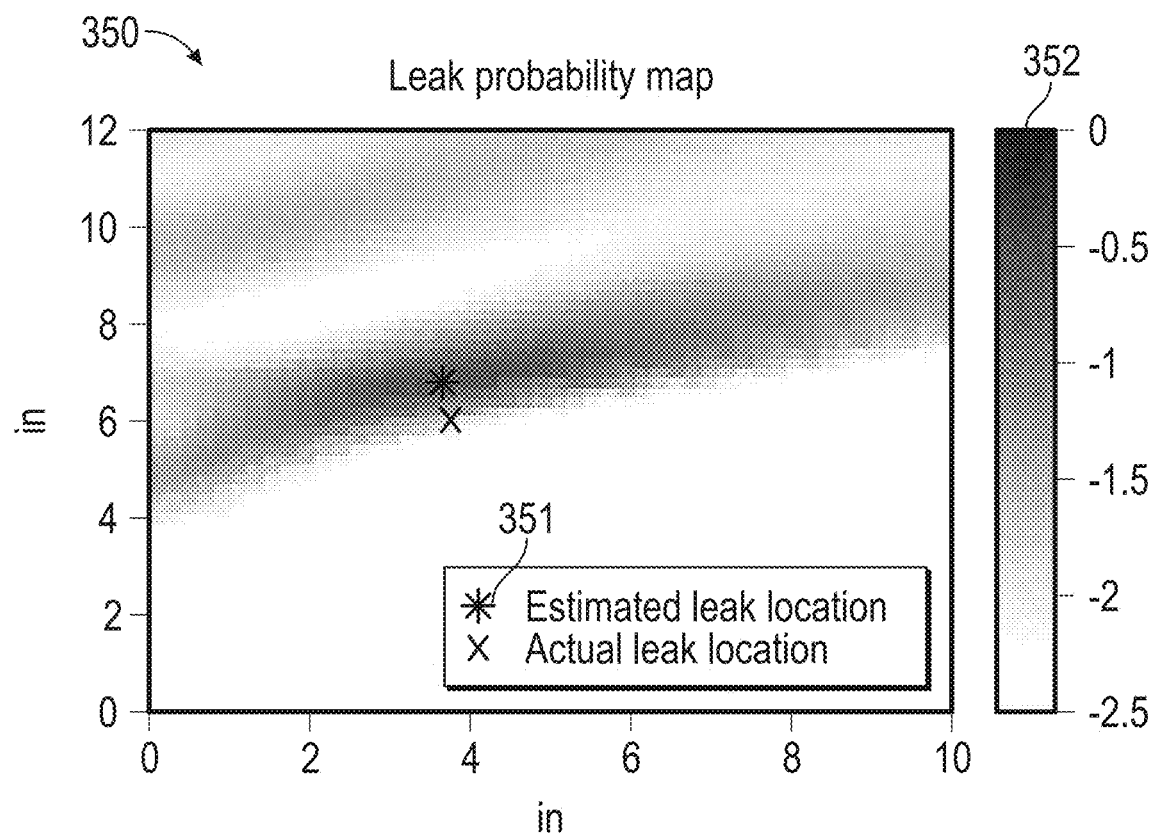
FIG. 3B illustrates a plot of an example of a leak probability map indicating a probability of the water leak source for each map location.

FIG. 3B illustrates a plot of an example of a leak probability map 350 indicating a probability of the water leak source for each map location. As illustrated, the x-axis represents a wellbore horizontal distance in a range of 0 to 10 inches, and the y-axis represents a wellbore vertical distance in a range of 0 to 12 inches. The probability values computed for the leak probability map 350 may be defined by a logarithmic scale 352 that is in a range of 0 to −2.5 by increments of 0.5 units, where the peak probability value (or greatest probability) is denoted (or marked) on the leak probability map 350 as an estimated leak location 351. As illustrated, the estimated leak location 351 is about 6 inches vertically from the reference location (e.g., (0,0)) and about 4 inches horizontally from the reference relocation.

Figure 4:
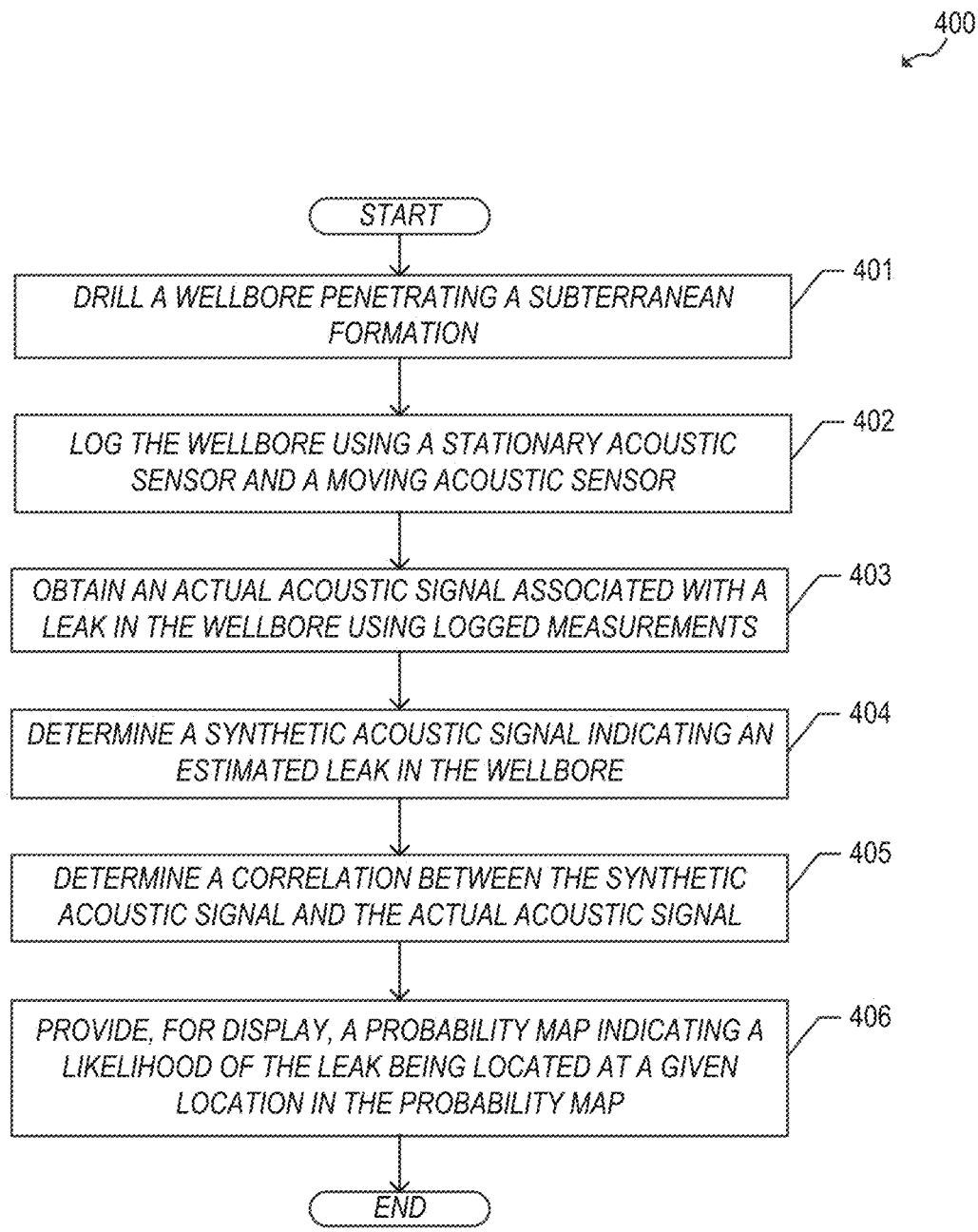
FIG. 4 illustrates an example process of imaging leaks and sound sources using a synthetic aperture according to certain aspects of the disclosure.

FIG. 4 illustrates a flow diagram of an example process 400 of synthetic aperture to image leaks and sound sources in accordance with one or more implementations. For explanatory purposes, the example process 400 is described herein with reference to the processor 538 of FIG. 5; however, the example process 400 is not limited to the processor 538 of FIG. 5, and one or more blocks of the example process 400 may be performed by one or more other components of the processor 538. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

Figure 5:
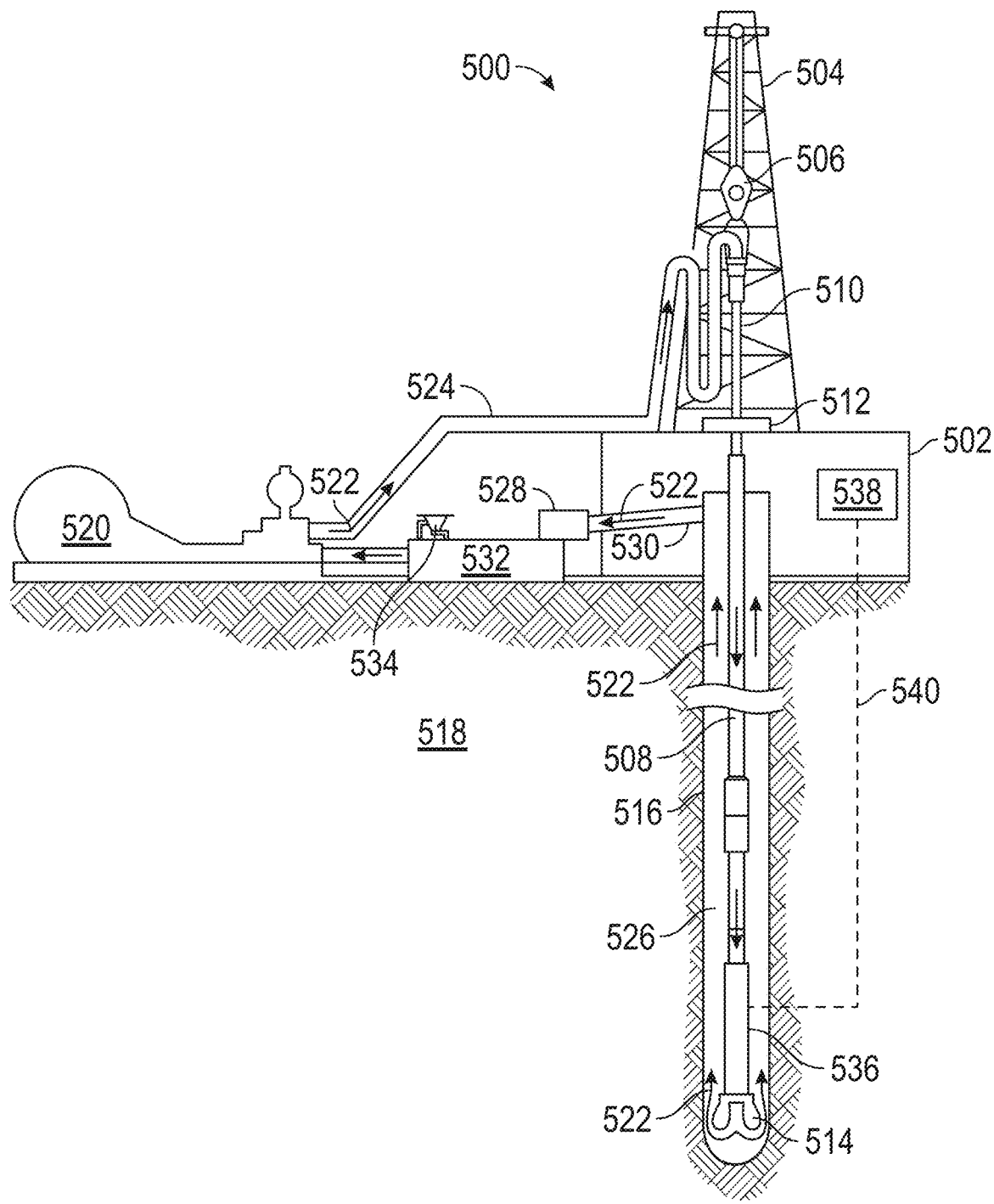
FIG. 5 illustrates an exemplary drilling assembly for implementing the processes described herein.

FIG. 5 illustrates an exemplary drilling assembly 500 for implementing the logging analysis methods described herein. It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

The example process 400 begins, at step 401, where the drilling assembly 500 drills a wellbore 516 penetrating a subterranean formation 518. As illustrated, the drilling assembly 500 may include a drilling platform 502 that supports a derrick 504 having a traveling block 506 for raising and lowering a drill string 508. The drill string 508 may include, but is not limited to, drill pipe and coiled tubing, as generally known to those skilled in the art. A kelly 510 supports the drill string 508 as it is lowered through a rotary table 512. A drill bit 514 is attached to the distal end of the drill string 508 and is driven either by a downhole motor and/or via rotation of the drill string 508 from the well surface. As the bit 514 rotates, it creates the wellbore 516 that penetrates various subterranean formations 518.

A pump 520 (e.g., a mud pump) circulates drilling mud 522 through a feed pipe 524 and to the kelly 510, which conveys the drilling mud 522 downhole through the interior of the drill string 508 and through one or more orifices in the drill bit 514. The drilling mud 522 is then circulated back to the surface via an annulus 526 defined between the drill string 508 and the walls of the wellbore 516. At the surface, the recirculated or spent drilling mud 522 exits the annulus 526 and may be conveyed to one or more fluid processing unit(s) 528 via an interconnecting flow line 530. After passing through the fluid processing unit(s) 528, a "cleaned" drilling mud 522 is deposited into a nearby retention pit 532 (i.e., a mud pit). While illustrated as being arranged at the outlet of the wellbore 516 via the annulus 526, those skilled in the art will readily appreciate that the fluid processing unit(s) 528 may be arranged at any other location in the drilling assembly 500 to facilitate its proper function, without departing from the scope of the scope of the disclosure.

Chemicals, fluids, additives, and the like may be added to the drilling mud 522 via a mixing hopper 534 communicably coupled to or otherwise in fluid communication with the retention pit 532. The mixing hopper 534 may include, but is not limited to, mixers and related mixing equipment known to those skilled in the art. In other implementations, however, the chemicals, fluids, additives, and the like may be added to the drilling mud 522 at any other location in the drilling assembly 500. In at least one implementation, for example, there may be more than one retention pit 532, such as multiple retention pits 532 in series. Moreover, the retention pit 532 may be representative of one or more fluid storage facilities and/or units where the chemicals, fluids, additives, and the like may be stored, reconditioned, and/or regulated until added to the drilling mud 522.

The processor 538 may be a portion of computer hardware used to implement the various illustrative blocks, modules, elements, components, methods, and algorithms described herein. The processor 538 may be configured to execute one or more sequences of instructions, programming stances, or code stored on a non-transitory, computer-readable medium. The processor 538 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some implementations, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented one or more sequences of code contained in a memory. In some implementations, such code can be read into the memory from another machine-readable medium. Execution of the sequences of instructions contained in the memory can cause a processor 538 to perform the process steps described herein. One or more processors 538 in a multi-processing arrangement can also be employed to execute instruction sequences in the memory. In addition, hard-wired circuitry can be used in place of or in combination with software instructions to implement various implementations described herein. Thus, the present implementations are not limited to any specific combination of hardware and/or software.

As used herein, a machine-readable medium will refer to any medium that directly or indirectly provides instructions to the processor 538 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

The drilling system 500 may further include a bottom hole assembly (BHA) coupled to the drill string 508 near the drill bit 514. The BHA may comprise various downhole measurement tools such as, but not limited to, measurement-while-drilling (MWD) and logging-while-drilling (LWD) tools, which may be configured to take downhole measurements of the surrounding subterranean formations 518. Along the drill string 508, logging while drilling (LWD) or measurement while drilling (MWD) equipment 536 is included. In one or more implementations, the drilling assembly 500 involves drilling the wellbore 516 while the logging measurements are made with the LWD/MWD equipment 536. More generally, the methods described herein involve introducing a logging tool into the wellbore where the logging tool may be an LWD logging tool, a MWD logging tool, a wireline logging tool, slickline logging tool, and the like.

According to the present disclosure, the LWD/MWD equipment 536 may include a stationary acoustic sensor and a moving acoustic sensor used to detect the flow of fluid flowing into and/or adjacent the wellbore 516. In an example, the stationary acoustic sensor may be arranged about the longitudinal axis of the LWD/MWD equipment 536, and, thus, of the wellbore 516 at a predetermined fixed location within the wellbore 516. The moving acoustic sensor may be arranged about the longitudinal axis of the LWD/MWD equipment 536, and, thus, of the wellbore 516, and is configured to move along the longitudinal axis of the wellbore 516. However, the arrangement of the stationary acoustic sensor and the moving acoustic sensor is not limited thereto and the acoustic sensors may be arranged in any configuration as required by the application and design.

The LWD/MWD equipment 536 may transmit the measured data to a processor 538 at the surface wired or wirelessly. Transmission of the data is generally illustrated at line 540 to demonstrate communicable coupling between the processor 538 and the LWD/MWD equipment 536 and does not necessarily indicate the path to which communication is achieved. The stationary acoustic sensor and the moving acoustic sensor may be communicably coupled to the line 540 used to transfer measurements and signals from the BHA to the processor 538 that processes the acoustic measurements and signals received by acoustic sensors (e.g., stationary acoustic sensor, moving acoustic sensor) and/or controls the operation of the BHA.

In the subject technology, the LWD/MWD equipment 536 may be capable of logging analysis of the subterranean formation 518 proximal to the wellbore 516. In step 402 of the process 400, the LWD/MWD equipment 536 may log the wellbore 516 using the stationary acoustic sensor and the moving acoustic sensor. At step 403, the processor 538, using the LWD/MWD equipment 536, may obtain an actual acoustic signal associated with a leak in the wellbore 516 using the logged measurements from the LWD/MWD equipment 536. Next, in step 404, the processor 538 may determine a synthetic acoustic signal indicating an estimated leak in the wellbore 516. Subsequently, in step 405, the processor 538 determines a correlation between the synthetic acoustic signal and the actual acoustic signal. Next, in step 406, the processor 538 may provide, for display, a probability map indicating a likelihood of the leak being located at a given location in the wellbore based on the probability map.

In some implementations, part of the processing may be performed by a telemetry module (not shown) combination with the processor 538. For example, the telemetry module may pre-process the individual sensor signals (e.g., through signal conditioning, filtering, and/or noise cancellation) and transmit them to a surface data processing system (e.g., the processor 538) for further processing, where the leak probability map is computed, and any flow-induced acoustic sources are detected and localized based thereon. In at least one implementation, the processor 538 may be configured to provide acoustic logs of the entire length of the wellbore 516 to provide a leak probability map of the flow of fluids and/or gas in the wellbore 516.

In various implementations, the processed acoustic signals are evaluated in conjunction with measurements from other sensors (e.g., temperature and surface well pressure measurements) to evaluate flow conditions and overall well integrity. The telemetry module may encompass any known means of downhole communication including, but not limited to, a mud pulse telemetry system, an acoustic telemetry system, a wired communications system, a wireless communications system, or any combination thereof. In certain implementations, some or all of the measurements taken by the stationary acoustic sensor and the moving acoustic sensor may also be stored within a memory associated with the acoustic sensors or the telemetry module for later retrieval at the surface upon retracting the drill string 508.

Figure 6:
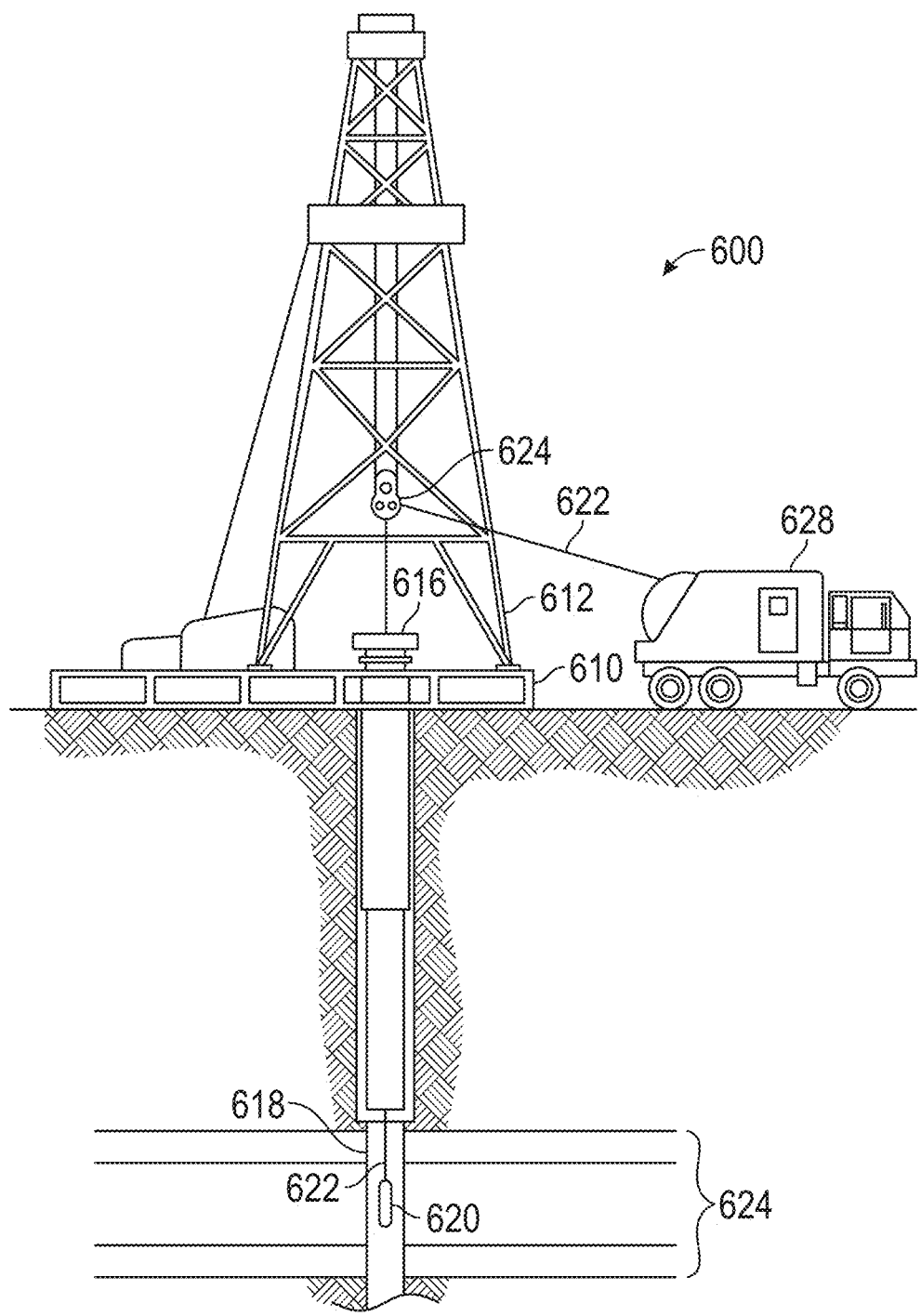
FIG. 6 illustrates a wireline system suitable for implementing the processes described herein.

FIG. 6 illustrates a logging assembly 600 having a wireline system suitable for implementing the logging analysis methods described herein. As illustrated, a platform 610 may be equipped with a derrick 612 that supports a hoist 614. Drilling oil and gas wells, for example, are commonly carried out using a string of drill pipes connected together so as to form a drilling string that is lowered through a rotary table 616 into a wellbore 618. Here, it is assumed that the drilling string has been temporarily removed from the wellbore 618 to allow a logging tool 620 to be lowered by wireline 622, slickline, or logging other cable into the wellbore 618. Typically, the logging tool 620 is lowered to a region of interest and subsequently pulled upward at a substantially constant speed. During the upward trip, instruments included in the logging tool 620 may be used to perform measurements on the subterranean formation 624 adjacent the wellbore 618 as the logging tool 620 passes by.

The logging tool 620 may include one or more wireline instrument(s) that may be suspended into the wellbore 618 by the wireline 622. The wireline instrument(s) may include the stationary acoustic sensor and the moving acoustic sensor, which may be communicably coupled to the wireline 622. The wireline 622 may include conductors for transporting power to the wireline instrument and also facilitate communication between the surface and the wireline instrument. The logging tool 620 may include a mechanical component for causing movement of the moving acoustic sensor. In some implementations, the mechanical component may need to be calibrated to provide a mare accurate mechanical motion when the moving acoustic sensor is being repositioned along the longitudinal axis of the wellbore 618.

The acoustic sensors (e.g., the stationary acoustic sensor, the moving acoustic sensor) may include electronic sensors, such as hydrophones, piezoelectric sensors, piezoresistive sensors, electromagnetic sensors, accelerometers, or the like. In other implementations, the acoustic sensors may comprise fiber optic sensors, such as point sensors (e.g., fiber Bragg gratings, etc.) distributed at desired or predetermined locations along the length of an optical fiber. In yet other implementations, the acoustic sensors may comprise distributed acoustic sensors, which may also use optical fibers and permit a distributed measurement of local acoustics at any given point along the fiber. In still other implementations, the acoustic sensors may include optical accelerometers or optical hydrophones that have fiber optic cablings.

Additionally or alternatively, in an example (not explicitly illustrated), the acoustic sensors may be attached to or embedded within the one or more strings of casing lining the wellbore 618 and/or the wall of the wellbore 618 at an axially spaced predetermined distance.

A logging facility 628, shown in FIG. 6 as a truck, may collect measurements from the acoustic sensors (e.g., the stationary acoustic sensor, the moving acoustic sensor), and may include the processor 538 for controlling, processing, storing, and/or visualizing the measurements gathered by the acoustic sensors. The processor 538 may be communicably coupled to the wireline instrument(s) by way of the wireline 622. Alternatively, the measurements gathered by the logging tool 620 may be transmitted (wired or wirelessly) or physically delivered to computing facilities off-site where the methods and processes described herein may be implemented.

Figure 7:
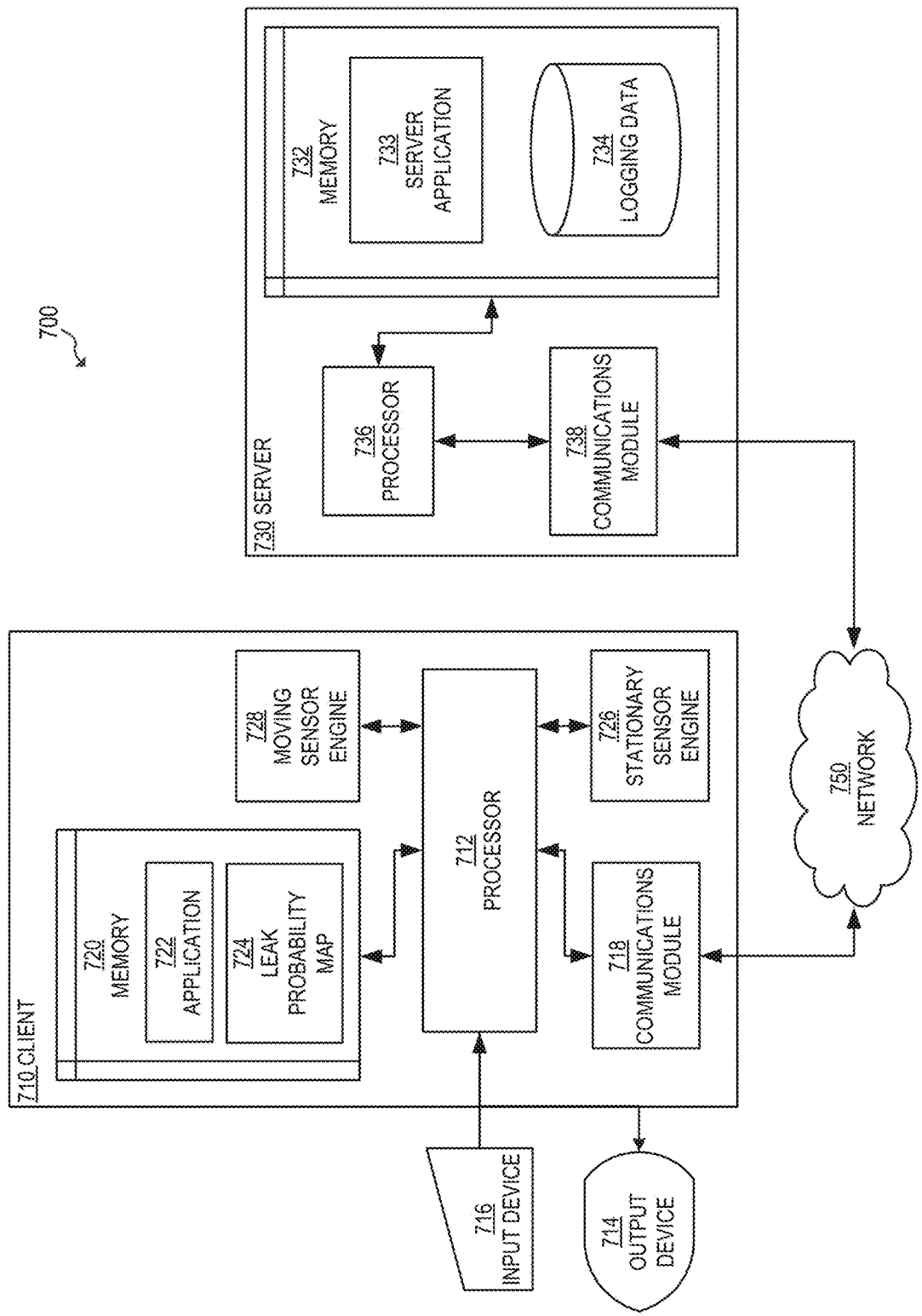
FIG. 7 is a block diagram illustrating an example client and server according to certain aspects of the disclosure.

FIG. 7 is a block diagram 700 illustrating an example server 730 and client 710 in the architecture 700 of FIG. 7 according to certain aspects of the disclosure. The client 710 may represent the logging tool 620 of FIG. 6 and the server 730 may represent the processor 538 of FIG. 5 in some implementations, or the client 710 may represent the processor 538 and the server 730 may represent the off-site computing facilities in other implementations.

The client 710 and the server 730 are connected over the network 750 via respective communications modules 718 and 738. The communications modules 718 and 738 are configured to interface with the network 750 to send and receive information, such as data, requests, responses, and commands to other devices on the network. The communications modules 718 and 738 can be, for example, modems or Ethernet cards.

The server 730 includes a memory 732, a processor 736, and a communications module 738. The memory 732 of the server 730 includes a server application 732. The processor 736 of the server 730 is configured to execute instructions, such as instructions physically coded into the processor 736, instructions received from software in the memory 732, or a combination of both. The memory 732 includes a server application 733. The processor 736 of the server 730 executes instructions from the server application 733 causing the processor 736 to process acoustic sensing signals received from the client 710 over the network 750 in order to determine a synthetic acoustic signal for correlation with one or more measurements from the moving acoustic sensor in order to generate a leak probability map. The memory 732 also includes logging data 734. The logging data 734 may include the logging measurements received from the client 710 over the network 750. In some aspects, the server 730 may post-process the measured acoustic signals that may be stored in the logging data 734.

The client 710 includes a processor 712, the communications module 718, and the memory 720 that includes an application 722. The client 710 also includes a stationary acoustic sensor 726 and a moving acoustic sensor 728. The application 722 may be an acoustic sensing analysis tool, or physically coded instructions that execute a real-time analysis of acoustic signal measurements from the stationary acoustic sensor and the moving acoustic sensor in order to probabilistically image a leak source observed in the subterranean formation. The client 710 also includes an input device 716, such as a keyboard, mouse, touchscreen and/or game controller, and an output device 714, such as a display. The memory 720 also includes a leak probability map 724. The leak probability map 724 may be a data structure containing a two-dimensional representation of data points respectively indicating a likelihood of a leak source being located at that map coordinate. The leak probability map 724 may include a set of probability maps, where each map is a different probability map for each depth level of a wellbore. In some aspects, the processor 712 receives user input via the input device 716, where the user input indicates the type of material of an annulus composition such that velocity and density metrics of an acoustic signal traveling through the wellbore 618 can be determined.

The processor 712 of the client 710 is configured to execute instructions, such as instructions physically coded into the processor 712, instructions received from software in the memory 720, or a combination of both. The processor 712 of the client 710 executes instructions from the application 722 causing the processor 712 to run a process that generates a synthetic aperture to image leaks and sound sources.

The processor 712, using the application 722, may obtain an actual acoustic signal associated with a leak source (e.g., 203) in a wellbore (e.g., 618) using logged measurements from a logging tool. The processor 712, using the application 722, may determine a synthetic acoustic signal indicating an estimated leak source in the wellbore. The processor 712, using the application 722, may determine a correlation between the synthetic acoustic signal and the actual acoustic signal. The processor 712, using the application 722, may generate a probability map from the determined correlation, in which the probability map indicates a likelihood of the leak source being located at a given location in the wellbore 618 based on the probability map. The processor 712, using the application 722, may store the probability map in the memory 720 as the leak probability map 724.

In some aspects, the processor 712, using the moving acoustic sensor engine 728, may send an instruction to a logging assembly (e.g., 600) to position a moving acoustic sensor of the logging tool along a longitudinal axis of the wellbore 618. In some aspects, the moving acoustic sensor is configured to traverse at least a portion of the wellbore 618 relative to a stationary acoustic sensor of the logging tool along the longitudinal axis of the wellbore 618.

In some aspects, the processor 712, using the moving acoustic sensor engine 728, may obtain predetermined trajectory information of a moving acoustic sensor. In some aspects, the predetermined trajectory information indicates a plurality of receiver locations along a longitudinal axis of the wellbore 618. In some aspects, the moving acoustic sensor is configured to measure a respective acoustic signal of the leak source at each of the plurality of receiver locations. In some aspects, the predetermined trajectory information indicates a distance between a starting receiver location of the plurality of receiver locations and an ending receiver location of the plurality of receiver locations. In one or more aspects, the moving acoustic sensor is moved from the starting receiver location to the ending receiver location during logging of the wellbore 618.

In obtaining the actual acoustic signal, the processor 712, using the stationary acoustic sensor engine 726, extracts a first acoustic signal measurement corresponding to a predetermined sampling time period from the logged measurements. In some aspects, the first acoustic signal measurement is obtained by the stationary acoustic sensor positioned at a fixed location in the wellbore 618.

In determining the synthetic acoustic signal, the processor 712, using the application 722 and the stationary acoustic sensor engine 726, modifies the first acoustic signal measurement using the predetermined trajectory information and a candidate source location. In modifying the first acoustic signal measurement, the processor 712, using the application 722 and the stationary acoustic sensor engine 726, calculates a first time period corresponding to an amount of time that elapsed for a source acoustic signal generated by the leak source to arrive at the fixed location of the stationary acoustic sensor. The processor 712, using the application 722 and the stationary acoustic sensor engine 726, shifts the first acoustic signal measurement by the first time period. The processor 712, using the application 722 and the stationary acoustic sensor engine 726, calculates a second time period corresponding to an amount of time that elapsed for the source acoustic signal to arrive to at least one of the plurality of receiver locations. The processor 712, using the application 722 and the stationary acoustic sensor engine 726, determines a number of relevant time samples of the shifted first acoustic signal measurement using the second time period to produce the synthetic acoustic signal.

In generating the leak probability map 724, the processor 712, using the application 722, combines each of the number of relevant time samples of the synthetic acoustic signal with a second acoustic signal measurement from the moving acoustic sensor to produce a probability value. The processor 712 can then assign the probability value to one of a plurality locations in the leak probability map 724. In the combining, the processor 712, using the application 722, multiplies each of the number of relevant time samples to the second acoustic signal measurement to produce an array of multiplied values. The processor 712 can then sum the multiplied values from the array of multiplied values to produce the probability value.

The processor 712, using the moving acoustic sensor engine 728, determines a signal-to-noise ratio (SNR) of the second acoustic signal measurement from the moving acoustic sensor. The processor 712, using the moving acoustic sensor engine 728, can determine whether the SNR of the second acoustic signal measurement exceeds a predetermined threshold. The processor 712, using the moving acoustic sensor engine 728, modifies the predetermined trajectory information when it is determined that the SNR of the second acoustic signal measurement does not exceed the predetermined threshold. In some aspects, the distance between the starting receiver location and the ending receiver location is reduced until the SNR is determined to exceed the predetermined threshold.

The processor 712, using the application 722, obtains a search survey indicating a two-dimensional representation of a plurality of search locations for the leak source at a given depth level within the wellbore 618. The processor 712, using the application 722, can then select one of the plurality of search locations from the search survey, where the candidate source location indicates the selected search location. The processor 712, using the application 722, determines whether each of the plurality of search locations from the search survey has been exhausted. The processor 712, using the application 722, modifies the candidate source location when it is determined, that each of the plurality of search locations has not been exhausted. In some aspects, the probability map is generated when it is determined that each of the plurality of search locations has been exhausted.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
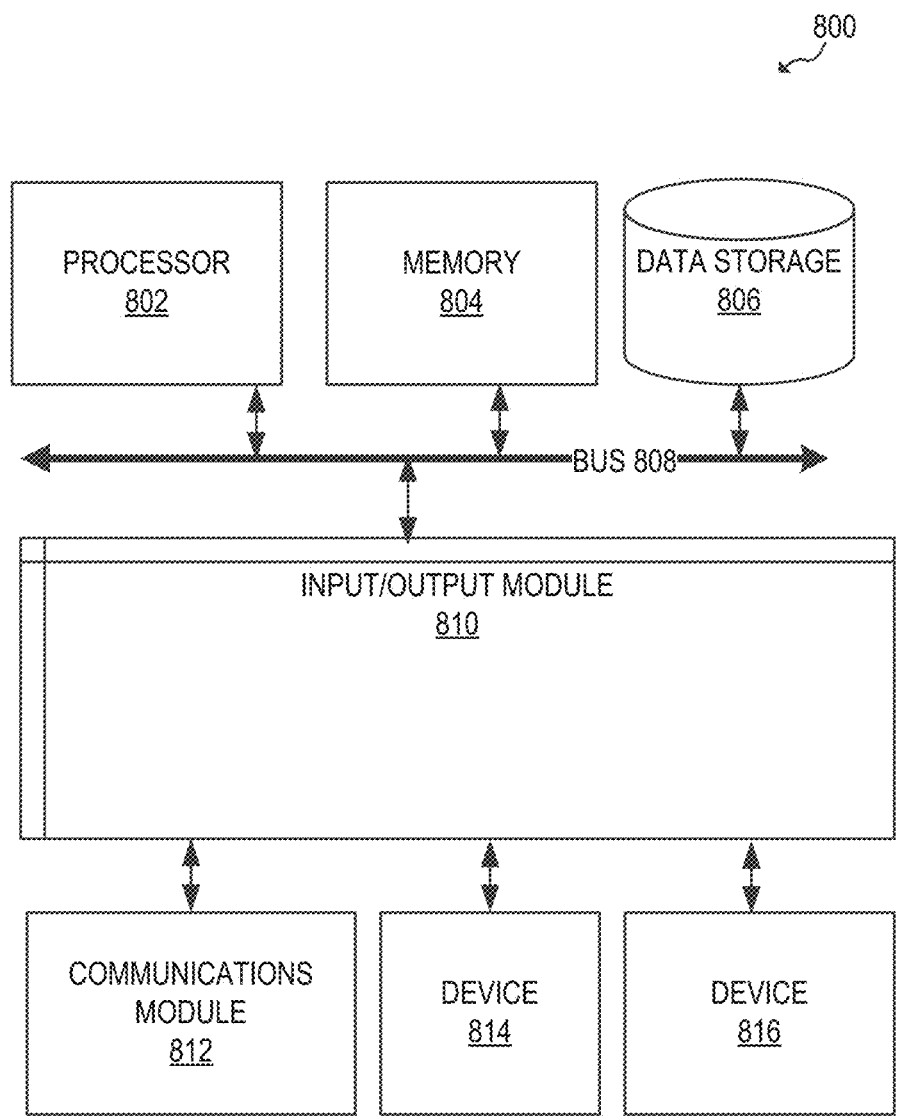
FIG. 8 is a block diagram illustrating an example computer system with which the client of FIG. 7 can be implemented.

FIG. 8 is a block diagram illustrating an exemplary computer system 800 with which the client 710 and server 730 of FIG. 7 can be implemented. In certain aspects, the computer system 800 may be implemented using hardware or a combination of software and hardware, in a dedicated server, integrated into another entity, or distributed across multiple entities.

Computer system 800 (e.g., client 710 and server 730) includes a bus 808 or other communication mechanism for communicating information, and a processor 802 (e.g., processor 712 and 736) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 720 and 732), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 718 and 738) include networking interface cards, such as Ethernet cards and modems. In certain aspects, the input/output module 810 is configured to connect to a plurality of devices, such as an input device 814 (e.g., input device 716) and/or an output device 816 (e.g., output device 714). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, the client 710 and server 730 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in the memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 750) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone such as a smartphone.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

A method includes obtaining an actual acoustic signal associated with a leak source in a wellbore using logged measurements. The method also includes determining a synthetic acoustic signal indicating an estimated leak source in the wellbore. The method also includes determining a correlation between the synthetic acoustic signal and the actual acoustic signal. The method also includes generating a probability map from the determined correlation, in which the probability map indicates a likelihood of the leak source being located at a given location in the wellbore based on the probability map.

The method also includes positioning a stationary acoustic sensor and a moving acoustic sensor along a longitudinal axis of the wellbore. In some aspects, the moving acoustic sensor is configured to traverse at least a portion of the wellbore relative to the stationary acoustic sensor along the longitudinal axis of the wellbore.

The method also includes obtaining predetermined trajectory information of a moving acoustic sensor, the predetermined trajectory information indicating a plurality of receiver locations along a longitudinal axis of the wellbore. In some aspects, the moving acoustic sensor is configured to measure a respective acoustic signal of the leak source at each of the plurality of receiver locations.

In some aspects, the predetermined trajectory information indicates a distance between a starting receiver location of the plurality of receiver locations and an ending receiver location of the plurality of receiver locations, the moving acoustic sensor being moved from the starting receiver location to the ending receiver location during logging of the wellbore.

In obtaining the actual acoustic signal, the method also includes extracting a first acoustic signal measurement corresponding to a predetermined sampling time period from the logged measurements, the first acoustic signal measurement being obtained by a stationary acoustic sensor positioned at a fixed location in the wellbore.

In determining the synthetic acoustic signal, the method also includes modifying the first acoustic signal measurement using the predetermined trajectory information and a candidate source location.

In modifying the first acoustic signal measurement, the method also includes calculating a first time period corresponding to an amount of time that elapsed for a source acoustic signal generated by the leak source to arrive at the fixed location of the stationary acoustic sensor. The method also includes shifting the first acoustic signal measurement by the first time period. The method also includes calculating a second time period corresponding to an amount of time that elapsed for the source acoustic signal to arrive to at least one of the plurality of receiver locations.

The method also includes determining a number of relevant samples of the shifted first acoustic signal measurement using the second time period to produce the synthetic acoustic signal.

In generating the probability map, the method also includes combining each of the number of relevant samples of the synthetic acoustic signal with a second acoustic signal measurement from the moving acoustic sensor to produce a probability value. The method also includes assigning the probability value to one of a plurality locations in the probability map.

The method also includes multiplying each of the number of relevant samples to the second acoustic signal measurement to produce an array of multiplied values. The method also includes summing the multiplied values from the array of multiplied values to produce the probability value.

The method also includes determining a signal-to-noise ratio (SNR) of the second acoustic signal measurement from the moving acoustic sensor. The method also includes determining whether the SNR of the second acoustic signal measurement exceeds a predetermined threshold. The method also includes modifying the predetermined trajectory information when it is determined that the SNR of the second acoustic signal measurement does not exceed the predetermined threshold. In some aspects, the distance between the starting receiver location and the ending receiver location is reduced until the SNR is determined to exceed the predetermined threshold.

The method also includes obtaining a search survey indicating a two-dimensional representation of a plurality of search locations for the leak source at a given depth level within the wellbore.

The method also includes selecting one of the plurality of search locations from the search survey, the candidate source location indicating the selected search location.

The method also includes determining whether each of the plurality of search locations from the search survey has been exhausted. The method also includes modifying the candidate source location when it is determined that each of the plurality of search locations has not been exhausted. In some aspects, the probability map is generated when it is determined that each of the plurality of search locations has been exhausted.

The method also includes logging the wellbore using a stationary acoustic sensor and a moving acoustic sensor to provide the actual acoustic signal.

A method includes logging a wellbore using a stationary acoustic sensor and a moving acoustic sensor. The method also includes obtaining an actual acoustic signal associated with a leak source in a wellbore using logged measurements from the stationary acoustic sensor. The method also includes determining a synthetic acoustic signal based on the logged measurements, the synthetic acoustic signal indicating an estimated leak source in the wellbore. The method also includes comparing the synthetic acoustic signal to the actual acoustic signal to determine a correlation. The method also includes generating a probability map from the determined correlation, in which the probability map indicates a likelihood of the leak source being located at a given location in the wellbore based on the probability map.

In determining the synthetic acoustic signal, the method includes calculating a first time period corresponding to an amount of time that elapsed for a source acoustic signal generated by the leak source to arrive at a fixed location of the stationary acoustic sensor within the wellbore. The method also includes shifting a first acoustic signal measurement from the stationary acoustic sensor by the first time period. The method also includes calculating a second time period corresponding to an amount of time that elapsed for the source acoustic signal to arrive to at least one of a plurality of receiver locations of the moving acoustic sensor. The method also includes determining a number of relevant samples of the shifted first acoustic signal measurement using the second time period to produce the synthetic acoustic signal. In some aspects, in determining the correlation, the method also includes multiplying each of the number of relevant samples to a second acoustic signal measurement from the moving acoustic sensor to produce an array of multiplied values, summing the multiplied values from the array of multiplied values to produce a probability value. In some aspects, in generating the probability map, the method also includes assigning the probability value to one of a plurality locations in the probability map.

The method also includes determining a signal-to-noise ratio (SNR) of a second acoustic signal measurement from the moving acoustic sensor. The method also includes determining whether the SNR of the second acoustic signal measurement exceeds a predetermined threshold. The method also includes modifying predetermined trajectory information of the moving acoustic sensor when it is determined that the SNR of the second acoustic signal measurement does not exceed the predetermined threshold. In some aspects, the predetermined trajectory information indicates a distance between a starting receiver location of the plurality of receiver locations and an ending receiver location of the plurality of receiver locations along a longitudinal axis of the wellbore. In one or more aspects, the distance between the starting receiver location and the ending receiver location is reduced until the SNR is determined to exceed the predetermined threshold.

A system includes a logging tool comprising a stationary acoustic sensor and a moving acoustic sensor. The system also includes one or more processors, a non-transitory computer-readable medium coupled to the logging tool to receive data from the logging tool and encoded with instructions that, when executed by the one or more processors, cause the one or more processors to perform operations. The operations include obtaining an actual acoustic signal associated with a leak source in a wellbore using togged measurements. The operations also include determining a synthetic acoustic signal indicating an estimated leak source in the wellbore. The operations also include determining a correlation between the synthetic acoustic signal and the actual acoustic signal. The operations also include generating a probability map from the determined correlation, in which the probability map indicates a likelihood of the leak source being located at a given location in the wellbore based on the probability map.

In determining the synthetic acoustic signal, the operations include calculating a first time period corresponding to an amount of time that elapsed for a source acoustic signal generated by the leak source to arrive at a fixed location of the stationary acoustic sensor within the wellbore. The operations also include shifting a first acoustic signal measurement from the stationary acoustic sensor by the first time period. The operations also include calculating a second time period corresponding to an amount of time that elapsed for the source acoustic signal to arrive to at least one of a plurality of receiver locations of the moving acoustic sensor. The operations also include determining a number of relevant samples of the shifted first acoustic signal measurement using the second time period to produce the synthetic acoustic signal. In some aspects, in determining the correlation, the operations also include multiplying each of the number of relevant samples to a second acoustic signal measurement from the moving acoustic sensor to produce an array of multiplied values, summing the multiplied values from the array of multiplied values to produce a probability value. In one or more aspects, in generating the probability map, the operations also include assigning the probability value to one of a plurality locations in the probability map.

The operations also include determining a signal-to-noise ratio (SNR) of a second acoustic signal measurement from the moving acoustic sensor. The operations also include determining whether the SNR of the second acoustic signal measurement exceeds a predetermined threshold. The operations also include modifying predetermined trajectory information of the moving acoustic sensor when it is determined that the SNR of the second acoustic signal measurement does not exceed the predetermined threshold. In some aspects, the predetermined trajectory information indicates a distance between a starting receiver location of the plurality of receiver locations and an ending receiver location of the plurality of receiver locations along a longitudinal axis of the wellbore. In one or more aspects, the distance between the starting receiver location and the ending receiver location is reduced until the SNR is determined to exceed the predetermined threshold.

The system also includes a drilling assembly to drill the wellbore penetrating a subterranean formation.

The logging tool is configured to log the wellbore using the stationary acoustic sensor and the moving acoustic sensor of the logging tool to provide the actual acoustic signal.

In one more aspects, examples of clauses are described below.

A method comprising one or more methods, operations or portions thereof described herein.

An apparatus comprising one or more memories and one or more processors (e.g., 710), the one or more processors configured to cause performing one or more methods, operations or portions thereof described herein.

An apparatus comprising one or more memories (e.g., 720, one or more internal, external or remote memories, or one or more registers) and one or more processors (e.g., 712) coupled to the one or more memories, the one or more processors configured to cause the apparatus to perform one or more methods, operations or portions thereof described herein.

An apparatus comprising means (e.g., 710) adapted for performing one or more methods, operations or portions thereof described herein.

A processor (e.g., 712) comprising modules for carrying out one or more methods, operations or portions thereof described herein.

A hardware apparatus comprising circuits (e.g., 710) configured to perform one or more methods, operations or portions thereof described herein.

An apparatus comprising means (e.g., 710) adapted for performing one or more methods, operations or portions thereof described herein.

An apparatus comprising components (e.g., 710) operable to carry out one or more methods, operations or portions thereof described herein.

A computer-readable storage medium (e.g., 720, one or more internal, external or remote memories, or one or more registers) comprising instructions stored therein, the instructions comprising code for performing one or more methods or operations described herein.

A computer-readable storage medium (e.g., 720, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may imply be described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not tended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method, comprising:
   positioning a first tool at a fixed location at a center position of a wellbore, wherein the first tool is a stationary acoustic sensor;
   recording with the stationary acoustic sensor to produce a logged measurement data;
   positioning a second tool along a longitudinal axis of the wellbore, wherein the second tool is a moving acoustic sensor, configured to traverse at least a portion of the wellbore relative to the first tool along the longitudinal axis of the wellbore;

recording with the moving acoustic sensor to add to the logged measurement data;
obtaining an actual acoustic signal associated with a leak source in the wellbore using logged measurement data;
determining a synthetic acoustic signal indicating an estimated leak source in the wellbore;
determining a correlation between the synthetic acoustic signal and the actual acoustic signal;
generating a probability map from the determined correlation, the probability map indicating a likelihood of the leak source being located at a given location in the wellbore based on the probability map; and
generating a probability map from the determined correlation, the probability map indicating a likelihood of the leak source being located at a given location in the wellbore based on the probability map;
obtaining a predetermined trajectory information of the moving acoustic sensor wherein the predetermined trajectory information indicates a distance between a starting receiver location of a plurality of receiver locations and an ending receiver location of the plurality of receiver locations, the moving acoustic sensor being moved from the starting receiver location to the ending receiver location during logging of the well bore, the predetermined trajectory information indicating the plurality of receiver locations along a longitudinal axis of the wellbore, the moving acoustic sensor being configured to measure a respective acoustic signal of the leak source at each of the plurality of receiver locations;
extracting a first acoustic signal measurement corresponding to a predetermined sampling time period from the logged measurement data, the first acoustic signal measurement being obtained by the stationary acoustic sensor logged measurement data;
calculating a first time period corresponding to an amount of time that elapsed for a source acoustic signal generated by the leak source to arrive at the fixed location of the stationary acoustic sensor;
shifting the first acoustic signal measurement data by the first time period; and
calculating a second time period corresponding to an amount of time that elapsed for the source acoustic signal to arrive to at least one of the plurality of receiver locations.

2. The method of claim 1, further comprising:
determining a number of relevant samples of the shifted first acoustic signal measurement data using the second time period to produce the synthetic acoustic signal.

3. The method of claim 2, wherein generating the probability map comprises: combining each of the number of relevant samples of the synthetic acoustic signal,
with a second acoustic signal measurement data from the moving acoustic sensor to produce a probability value; and
assigning the probability value to one of a plurality locations in the probability map.

4. The method of claim 3, wherein the combining comprises:
multiplying each of the number of relevant samples to the second acoustic signal measurement data to produce an array of multiplied values; and
summing the multiplied values from the array of multiplied values to produce the probability value.

5. The method of claim 3, further comprising:
determining a signal-to-noise ratio (SNR) of the second acoustic signal measurement data from the moving acoustic sensor;
determining whether the SNR of the second acoustic signal measurement data exceeds a predetermined threshold; and
modifying the predetermined trajectory information when it is determined that the SNR of the second acoustic signal measurement data does not exceed the predetermined threshold, the distance between the starting receiver location and the ending receiver location being reduced until the SNR is determined to exceed the predetermined threshold.

6. The method of claim 1, further comprising:
obtaining a search survey indicating a two-dimensional representation of a plurality of search locations for the leak source at a given depth level within the well bore.

7. The method of claim 6, further comprising:
selecting one of the plurality of search locations from the search survey, the candidate source location indicating the selected search location.

8. The method of claim 7, further comprising:
determining whether each of the plurality of search locations from the search survey has been exhausted; and
modifying the candidate source location when it 1s determined that each of the plurality of search locations has not been exhausted,
wherein the probability map is generated when it 1s determined that each of the plurality of search locations has been exhausted.

9. The method of claim 1, further comprising:
logging the wellbore using a stationary acoustic sensor and a moving acoustic sensor to provide the actual acoustic signal.

10. A method comprising:
positioning a first tool at a fixed location in a center position of a wellbore, wherein the first tool is a stationary acoustic sensor;
recording with the stationary acoustic sensor to produce a logged measurement data;
positioning a second tool along a longitudinal axis of the wellbore, wherein the second tool is a moving acoustic sensor, configured to traverse at least a portion of the wellbore relative to the first tool along the longitudinal axis of the wellbore;
recording with the moving acoustic sensor to add to the logged measurement data;
logging a wellbore using the stationary acoustic sensor and the moving acoustic sensor;
determining a synthetic acoustic signal based on the stationary acoustic sensor logged measurements data based on at least a moving acoustic sensor trajectory and a predetermined source location, wherein the synthetic acoustic signal indicating an estimated leak source in the wellbore;
obtaining an actual acoustic signal associated with a leak source in the wellbore using logged measurement data;
comparing the synthetic acoustic signal to the actual acoustic signal to determine a correlation;
generating a probability map from the determined correlation, the probability map indicating a likelihood of the leak source being located at a given location in the wellbore based on the probability map;
calculating a first time period corresponding to an amount of time that elapsed for a source acoustic signal generated by the leak source to arrive at a fixed location of the stationary acoustic sensor within the wellbore;

shifting a first acoustic signal measurement data from the stationary acoustic sensor by the first time period;

calculating a second time period corresponding to an amount of time that elapsed for the source acoustic signal to arrive to at least one of a plurality of receiver locations of the moving acoustic sensor; and determining a number of relevant samples of the shifted first acoustic signal measurement data using the second time period to produce the synthetic acoustic signal, wherein determining the correlation comprises:

multiplying each of the number of relevant samples to a second acoustic signal measurement data from the moving acoustic sensor to produce an array of multiplied values; and summing the multiplied values from the array of multiplied values to produce a probability value, wherein generating the probability map comprises:

assigning the probability value to one of a plurality of locations in the probability map.

11. The method of claim 10, further comprising:

determining a signal-to-noise ratio (SNR) of a second acoustic signal measurement data from the moving acoustic sensor;

determining whether the SNR of the second acoustic signal measurement data exceeds a predetermined threshold; and modifying predetermined trajectory information of the moving acoustic sensor when it is determined that the SNR of the second acoustic signal measurement data does not exceed the predetermined threshold, the predetermined trajectory information indicating a distance between a starting receiver location of the plurality of receiver locations and an ending receiver location of the plurality of receiver locations along a longitudinal axis of the wellbore, the distance between the starting receiver location and the ending receiver location being reduced until the SNR is determined to exceed the predetermined threshold.

12. A system comprising:

a first tool at a fixed location disposed at a center position of a wellbore, wherein the first tool is a stationary acoustic sensor;

a second tool along a longitudinal axis of the wellbore, wherein the second tool is a moving acoustic sensor, configured to traverse at least a portion of the wellbore relative to the first tool along the longitudinal axis of the wellbore;

a logging tool comprising the stationary acoustic sensor and the moving acoustic sensor; one or more processors; and a non-transitory computer-readable medium coupled to the logging tool to receive data from the logging tool and encoded with instructions that, when executed by the one or more processors, cause the one or more processors to initiate operations comprising:

determining a synthetic acoustic signal indicating an estimated leak source in the wellbore based on at least a moving acoustic sensor trajectory and a predetermined source location wherein determining the synthetic acoustic signal comprises:

calculating a first time period corresponding to an amount of time that elapsed for a source acoustic signal generated by the leak source to arrive at a fixed location of the stationary acoustic sensor within the wellbore;

shifting a first acoustic signal measurement data from the stationary acoustic sensor by the first time period;

calculating a second time period corresponding to an amount of time that elapsed for the source acoustic signal to arrive to at least one of a plurality of receiver locations of the moving acoustic sensor; and determining a number of relevant samples of the shifted first acoustic signal measurement data using the second time period to produce the synthetic acoustic signal, wherein determining the correlation comprises:

multiplying each of the number of relevant samples to a second acoustic signal measurement data from the moving acoustic sensor to produce an array of multiplied values; and summing the multiplied values from the array of multiplied values to produce a probability value, wherein generating the probability map comprises:

assigning the probability value to one of a plurality locations in the probability map;

processing the moving acoustic sensor logged measurement data with the synthetic acoustic signal to determine a correlation by exploiting a phase relationship of the logged measurement data between the stationary and moving acoustic sensors; and generating a probability map from the determined correlation, the probability map indicating a likelihood of the leak source being located at a given location in the wellbore based on the probability map.

13. The system of claim 12, wherein the operations further comprise:

determining a signal-to-noise ratio (SNR) of a second acoustic signal measurement data from the moving acoustic sensor;

determining whether the SNR of the second acoustic signal measurement data exceeds a predetermined threshold; and modifying predetermined trajectory information of the moving acoustic sensor when it is determined that the SNR of the second acoustic signal measurement data does not exceed the predetermined threshold, the predetermined trajectory information indicating a distance between a starting receiver location of the plurality of receiver locations and an ending receiver location of the plurality of receiver locations along a longitudinal axis of the wellbore, the distance between the starting receiver location and the ending receiver location being reduced until the SNR is determined to exceed the predetermined threshold.

14. The system of claim 12, further comprising:

a drilling assembly to drill the wellbore penetrating a subterranean formation.

15. The system of claim 12, wherein the logging tool is configured to log the wellbore using the stationary acoustic sensor and the moving acoustic sensor of the logging tool to provide the actual acoustic signal.

16. A method, comprising:

positioning a first tool at a fixed location at a center position of a wellbore, wherein the first tool is a stationary acoustic sensor;

recording with the stationary acoustic sensor to produce a logged measurement data;

positioning a second tool along a longitudinal axis of the wellbore, wherein the second tool is a moving acoustic sensor, configured to traverse at least a portion of the wellbore relative to the first tool along the longitudinal axis of the wellbore;
recording with the moving acoustic sensor to add to the logged measurement data;
obtaining an actual acoustic signal associated with a leak source in the wellbore using logged measurement data;
determining a synthetic acoustic signal indicating an estimated leak source in the wellbore;
determining a correlation between the synthetic acoustic signal and the actual acoustic signal; and
generating a probability map from the determined correlation, the probability map indicating a likelihood of the leak source being located at a given location in the wellbore based on the probability map;
obtaining a predetermined trajectory information of the moving acoustic sensor wherein the predetermined trajectory information indicates a distance between a starting receiver location of a plurality of receiver locations and an ending receiver location of the plurality of receiver locations, the moving acoustic sensor being moved from the starting receiver location to the ending receiver location during logging of the well bore, the predetermined trajectory information indicating the plurality of receiver locations along a longitudinal axis of the wellbore, the moving acoustic sensor being configured to measure a respective acoustic signal of the leak source at each of the plurality of receiver locations;
extracting a first acoustic signal measurement corresponding to a predetermined sampling time period from the logged measurement data, the first acoustic signal measurement being obtained by the stationary acoustic sensor logged measurement data;
calculating a first time period corresponding to an amount of time that elapsed for a source acoustic signal generated by the leak source to arrive at the fixed location of the stationary acoustic sensor;
shifting the first acoustic signal measurement data by the first time period;
calculating a second time period corresponding to an amount of time that elapsed for the source acoustic signal to arrive to at least one of the plurality of receiver locations; and
determining a number of relevant samples of the shifted first acoustic signal measurement data using the second time period to produce the synthetic acoustic signal.

17. A method comprising:
positioning a first tool at a fixed location in a center position of a wellbore, wherein the first tool is a stationary acoustic sensor;
recording with the stationary acoustic sensor to produce a logged measurement data;
positioning a second tool along a longitudinal axis of the wellbore, wherein the second tool is a moving acoustic sensor, configured to traverse at least a portion of the wellbore relative to the first tool along the longitudinal axis of the wellbore;
recording with the moving acoustic sensor to add to the logged measurement data;
logging a wellbore using the stationary acoustic sensor and the moving acoustic sensor;
determining a synthetic acoustic signal based on the stationary acoustic sensor logged measurements data, wherein the synthetic acoustic signal indicating an estimated leak source in the wellbore;
obtaining an actual acoustic signal associated with a leak source in the wellbore using logged measurement data;
comparing the synthetic acoustic signal to the actual acoustic signal to determine a correlation;
generating a probability map from the determined correlation, the probability map indicating a likelihood of the leak source being located at a given location in the wellbore based on the probability map;
calculating a first time period corresponding to an amount of time that elapsed for a source acoustic signal generated by the leak source to arrive at a fixed location of the stationary acoustic sensor within the wellbore;
shifting a first acoustic signal measurement data from the stationary acoustic sensor by the first time period;
calculating a second time period corresponding to an amount of time that elapsed for the source acoustic signal to arrive to at least one of a plurality of receiver locations of the moving acoustic sensor; and
determining a number of relevant samples of the shifted first acoustic signal measurement data using the second time period to produce the synthetic acoustic signal, wherein determining the correlation comprises:
multiplying each of the number of relevant samples to a second acoustic signal measurement data from the moving acoustic sensor to produce an array of multiplied values; and
summing the multiplied values from the array of multiplied values to produce a probability value, wherein generating the probability map comprises:
assigning the probability value to one of a plurality locations in the probability map;
determining a signal-to-noise ratio (SNR) of a second acoustic signal measurement data from the moving acoustic sensor;
determining whether the SNR of the second acoustic signal measurement data exceeds a predetermined threshold; and
modifying predetermined trajectory information of the moving acoustic sensor when it is determined that the SNR of the second acoustic signal measurement data does not exceed the predetermined threshold, the predetermined trajectory information indicating a distance between a starting receiver location of the plurality of receiver locations and an ending receiver location of the plurality of receiver locations along a longitudinal axis of the wellbore, the distance between the starting receiver location and the ending receiver location being reduced until the SNR is determined to exceed the predetermined threshold.

18. A system comprising:
a first tool at a fixed location disposed at a center position of a wellbore, wherein the first tool is a stationary acoustic sensor;
a second tool along a longitudinal axis of the wellbore, wherein the second tool is a moving acoustic sensor, configured to traverse at least a portion of the wellbore relative to the first tool along the longitudinal axis of the wellbore;
a logging tool comprising the stationary acoustic sensor and the moving acoustic sensor; one or more processors; and
a non-transitory computer-readable medium coupled to the logging tool to receive data from the logging tool and encoded with instructions that, when executed by the one or more processors, cause the one or more processors to initiate operations comprising:

determining a synthetic acoustic signal indicating an estimated leak source in the wellbore;

processing the moving acoustic sensor logged measurement data with the synthetic acoustic signal to determine a correlation by exploiting a phase relationship of the logged measurement data between the stationary and moving acoustic sensors;

generating a probability map from the determined correlation, the probability map indicating a likelihood of a leak source being located at a given location in the wellbore based on the probability map;

calculating a first time period corresponding to an amount of time that elapsed for a source acoustic signal generated by the leak source to arrive at a fixed location of the stationary acoustic sensor within the wellbore;

shifting a first acoustic signal measurement data from the stationary acoustic sensor by the first time period;

calculating a second time period corresponding to an amount of time that elapsed for the source acoustic signal to arrive to at least one of a plurality of receiver locations of the moving acoustic sensor; and determining a number of relevant samples of the shifted first acoustic signal measurement data using the second time period to produce the synthetic acoustic signal, wherein determining the correlation comprises:

multiplying each of the number of relevant samples to a second acoustic signal measurement data from the moving acoustic sensor to produce an array of multiplied values; and summing the multiplied values from the array of multiplied values to produce a probability value, wherein generating the probability map comprises:

assigning the probability value to one of a plurality of locations in the probability map;

determining a signal-to-noise ratio (SNR) of a second acoustic signal measurement data from the moving acoustic sensor;

determining whether the SNR of the second acoustic signal measurement data exceeds a predetermined threshold; and modifying predetermined trajectory information of the moving acoustic sensor when it is determined that the SNR of the second acoustic signal measurement data does not exceed the predetermined threshold, the predetermined trajectory information indicating a distance between a starting receiver location of the plurality of receiver locations and an ending receiver location of the plurality of receiver locations along a longitudinal axis of the wellbore, the distance between the starting receiver location and the ending receiver location being reduced until the SNR is determined to exceed the predetermined threshold.

* * * * *